Patented May 9, 1939

2,157,755

UNITED STATES PATENT OFFICE 2,157,755

FEED AND PROCESS OF PREPARING SAME

Chastain G. Harrel and Albert W. Lindert, Minneapolis, Minn., assignors to Pillsbury Flour Mills Company, Minneapolis, Minn., a corporation of Delaware No Drawing. Application June 23, 1937,
Serial No. 149,914

9 Claims. (Cl. 99—2)

This invention relates to feeds for poultry and stock and processes for preparing the same.

In preparing dry poultry and stock feeds, it is highly desirable to add minute quantities of high vitamin concentrates to large quantities of the feed mix. These high vitamin concentrates in the form of oils carry vitamin D and also vitamin A and they are highly expensive and they are often added in the proportions of approximately one ounce of the high vitamin concentrate to two thousand pounds of the feed. Difficulty is experienced in securing uniform distribution throughout the feed mix of the exceedingly small quantity of high vitamin concentrate. Greater difficulty is entailed in determining whether or not uniform distribution of the small quantity of high vitamin concentrate is secured throughout the large mass of feed. No quick chemical test is available for determining the uniform distribution of the high vitamin concentrate nor can a quick assay for vitamin D be made. In order to truly determine the presence of or lack of vitamin D in feeds, it has been necessary to run feed tests as on rats or other animals or fowls for considerable periods of time, such as six months. It is therefore highly desirable for feed manufacturers to have some method for visually determining the uniform distribution of small quantities of high vitamin concentrates in large masses of feed.

It is a common practice in preparing feeds today to add a minute quantity of high vitamin concentrate to a quantity of sardine or fish oil and to then add the resulting mixture to a large mass of the feed. While the volume of sardine or fish oil is large compared to the volume of high vitamin concentrate (approximately 100 to 1), the quantity of the mixture added to the large mass of dry feed is very small, approximately ten pounds of the sardine or fish oil with the high vitamin concentrate mixed therewith being often added to approximately two thousand pounds of feed. The problem of securing uniform distribution of the sardine or fish oil with concentrate added throughout the large mass of feed is therefore a difficult one and it is highly desirable that some method be provided for visually determining uniform distribution of the sardine or fish oil with concentrate added throughout the mass of feed.

Another difficulty that has presented itself to feed manufacturers is that of securing identification of its feeds after the feeds come to the hands of the distributor and the farmer. Claims are often brought against feed manufacturing companies by farmers for deaths resulting to poultry and stock because of feeds that have been fed to poultry or stock. It is, therefore, highly desirable for feed manufacturers to be enabled to identify their feeds after the bulk containers within which they are packed have been broken. It is also highly desirable to identify the feed of the manufacturer from samples taken from the stomach and excretia of the fowl or animal.

The natural oils as well as the artificial oils found in feeds when exposed to air and light tend to oxidize and/or become rancid. It is, therefore, highly desirable to protect the feed from exposure to light and air to prevent the oils from oxidizing or growing rancid.

It is accordingly one of the objects of this invention to provide a feed and a process of preparing the same to permit of determination of the uniformity of distribution of minute quantities of high vitamin concentrate throughout the feed.

It is another object to provide a feed and process of preparing the same to permit determination of the uniformity of distribution of small quantities of sardine and fish oils throughout the feed.

A further object is to provide a feed and a process of preparing the same whereby the natural and artificial oils in the feed will be better protected against the deleterious effects of exposure to light and air.

Still another object is to provide a feed and process of preparing the same, whereby identification of the feed may be made at any time either before or after the feed had been consumed by the animal or fowl to which it is supplied.

Another object is to combine all of the objects above specified in a particular feed and process of preparing the same.

The objects and advantages of the invention will more fully appear in the following description, wherein my improved feed and the processes of preparing the same are described.

Generally stated, my processes consist in adding an extremely minute quantity of a harmless oil soluble dye having a characteristic color to a minute quantity of high vitamin concentrate, thereafter adding the minute quantity of dyed high vitamin concentrate to a small quantity of sardine or fish oil, mixing the same thoroughly and thereafter adding the small quantity of sardine or fish oil to a large mass of feed and thoroughly mixing the same therewith.

The dye used may be any one of a number of harmless dyes which are soluble in oils but insoluble in water. For example, the dye designated 22 Yellow A B in the pamphlet issued September 1931, United States Department of Agriculture, Food and Drug Administration, entitled "Certification of Coal-Tar Food Colors" is one dye that is highly satisfactory for use. This dye has a characteristic golden yellow color. Other coal tar dyes can be used and it is also believed that other dyes not coal tar dyes, which are soluble in oils and not soluble in water may be employed. Yellow and green dyes are particularly beneficial for the reason that they will have the property of filtering out injurious light rays that promote oxidation and/or rancidity of the natural and artificial oils in the feed.

We have found that a highly satisfactory feed is produced using the following proportions of the various ingredients. To 1.09 ounces of the high vitamin concentrate containing vitamin D and also vitamin A, .22 ounce of No. 22 Yellow A B dye is added. The dye having been diffused through the high vitamin concentrate to color the same, the colored solution is added to approximately 10 pounds (1 and 1/8 gallon) of sardine or fish oil and mixed therewith. The oil mixture takes on the characteristic color of the dye. The oil mixture is then added to approximately 2000 pounds of the feed to which vitamin concentrates have not as yet been added. Preferably the oil mixture is sprayed into the feed while the feed is being agitated, so as to originally secure as wide distribution as possible of the small quantity of oil throughout the large mass of feed. The feed is then mixed thoroughly until uniform distribution of the oil is obtained throughout its mass. During the mixing process samples of the feed can be taken at different points in the mixer and examined to determine whether the oils have been uniformly distributed or not. The oils having the characteristic color of the dye, it will be possible for the trained eye to determine visibly whether or not uniform distribution of the small quantity of oil in the large mass of feed is being obtained. The mixing process should continue until the feed is uniformly colored throughout.

By thus adding the dye first to the high vitamin concentrate, then adding the colored vitamin concentrate to the relatively large quantity of sardine or fish oil, uniform distribution of the minute quantity of high vitamin concentrate can be secured by visible indication in the fish oil. Then by adding the relatively small quantity of mixed oils to the dry granular feed, uniformity of distribution of the high vitamin concentrate throughout the large mass of feed can be determined through visible indication quickly and easily by unskilled workmen without requiring the services of a chemist or long and involved feeding tests or the like.

As an oil soluble but water insoluble dye is used, the mixed feed will take the dye properly and retain it practically indefinitely. Thus the feed of a particular manufacturer so prepared can be identified at any time. It has been found that the feed will retain its color after being exposed to the action of air and moisture for long periods of time. It can also be identified in the crop of a fowl; it can be identified in the stomachs and intestinal tracts of fowls and animals; and it can even be identified in the excretia of fowls and animals. The colored feed is thus of great assistance to manufacturers for determining the merits of claims brought against manufacturers and distributors by reason of alleged death losses to stock and poultry by reason of use of the feed.

The dye added acts as a preservative to protect the feed and particularly the natural and added oils therein from deterioration through exposure to strong light and air. The dye acts as an antioxidant filtering out injurious light rays and preventing the oils from becoming rancid.

High vitamin concentrates containing the dye can be used in many different types and kinds of dry feeds. One typical feed for example, contains bran or shorts, cornmeal, alfalfa, fishmeal and mineral concentrates. Each feed mill has its own peculiar feed formulae for the various particular uses intended. My processes can be carried out with any of these feeds.

Considerable latitude is permissible in the proportions of the dye used, high vitamin concentrates used and fish or sardine oils used in connection with a ton of the dry feeds. The quantity of dye used depends largely on the concentration of the particular dye employed and the requisite visibility in the final product. From .1 ounce to 10 ounces of the dye can be employed for a 1 ton mix. Approximately 2.2 ounces of the dye is required to make the same quite readily visible to the naked eye in the final product. By refined methods, however, the dye can be identified in the final mix when but .01 ounce of the dye is employed. While smaller quantities of the dye are all that are required for securing the visual indication of the presence of the dye and the high vitamin concentrate in the final mix, the protective features of the invention to preserve the oils in the feed are best obtained when larger quantities of the dye are employed, i. e., approximately 10 ounces of the dye to a ton.

To a ton of the dry feed from .5 to 20 ounces of the high vitamin concentrate may be employed. While it is not absolutely necessary to use any sardine or fish oil, this is desirable and preferably from 5 to 40 pounds of the sardine or fish oil is employed with a ton of the feed.

The dye can be added either to the high vitamin concentrate before it is mixed with the sardine or fish oil or it can be added after the high vitamin concentrate has been mixed with the sardine or fish oil. If desired a dye having one characteristic color may be added to the high vitamin concentrate, a dye having a second characteristic color can be added to the sardine or fish oil and thereupon the concentrate with the first dye can be added to the sardine or fish oil containing the second dye to produce a blended color different than the characteristic color of either dye employed. It will also be appreciated that mineral or vegetable oils can be used with or substituted for the sardine or fish oil.

It will be seen that many benefits flow from the use of the processes described and that a novel and useful product has been provided.

It will, of course, be understood that various changes may be made in the product and in the processes and in the steps in the processes without departing from the scope of the present invention which generally stated consists in the matter described and set forth in the appended claims.

What is claimed is:

1. The process of preparing animal and poultry feeds which consists in adding a minute quantity of an oil soluble and water insoluble dye to a minute quantity of high vitamin concentrate to color the same, thereafter adding the colored high vitamin concentrate to a large mass of a dry feed and thereafter thoroughly mixing the colored high vitamin concentrate throughout the mass, the characteristic color of the dye indicating uniformity of distribution of the high vitamin concentrate throughout the mass and serving to identify by its characteristic color the feed so mixed.

2. The process of preparing animal and poultry feeds which consists in adding a minute quantity of an oil soluble and water insoluble dye together with a minute quantity of high vitamin concentrate to a small quantity of oil to color the same, thereafter adding the colored oil containing the high vitamin concentrate to a large mass of a dry feed and thereafter thoroughly mixing the oil with the mass, the characteristic color of the dye indicating uniformity of distribution of the oil throughout the mass and serving to identify by its characteristic color the feed so mixed.

3. The process of preparing animal and poultry feeds which consists in adding a minute quantity of an oil soluble and water insoluble dye to a small quantity of oil to color the same, thereafter adding the colored oil to a large mass of a dry feed and thereafter thoroughly mixing the oil with the mass.

4. The process of preparing animal and poultry feeds which consists in mixing together from .01 to 10 ounces of an oil soluble and water insoluble dye with .5 to 20 ounces of a high vitamin concentrate, thereafter adding the colored high vitamin concentrate to approximately 1 ton of dry feed and thoroughly mixing the colored high vitamin concentrate with the mass of dry feed.

5. The process of preparing animal and poultry feeds which consists in adding .01 to 10 ounces of an oil soluble and water insoluble dye to from .5 to 20 ounces of high vitamin concentrate, adding the resulting colored high vitamin concentrate to from 5 to 40 pounds of oil and mixing the same and thereafter adding the mixed oil to approximately a 1 ton mass of a dry feed and mixing the same.

6. The process defined in claim 5, the mixed oil being added to the dry feed by spraying.

7. The process of preparing animal and poultry feeds which consists in thoroughly mixing approximately 1 ton of a dry feed with approximately 1.09 ounces of high vitamin concentrate to which an oil soluble but water insoluble dye has been added.

8. A feed containing a minute quantity of high vitamin concentrate therein, the said concentrate being colored by an oil soluble but water insoluble dye.

9. A feed consisting of approximately 1 ton of dry feed thoroughly mixed with from .5 to 20 ounces of a high vitamin concentrate to which an oil soluble and water insoluble dye has been added.

CHASTAIN G. HARREL.
ALBERT W. LINDERT.